United States Patent Office 3,639,409
Patented Feb. 1, 1972

3,639,409
1,3,8-TRIAZA-2-OXO- OR THIOXO-3-SUBSTITUTED-4-OXO OR IMINO-7,7,9,9-TETRAALKYL SPIRO [4,5]DECANES
Keisuke Murayama, Syoji Morimura, and Toshimasa Toda, Tokyo, Japan, assignors to Sankyo Company Limited, Tokyo, Japan
No Drawing. Filed June 19, 1968, Ser. No. 738,104
Claims priority, application Japan, June 22, 1967, 43/19,265, 43/19,266; May 31, 1968, 44/37,145, 44/37,146
Int. Cl. C07d 29/36
U.S. Cl. 260—293.66
19 Claims

ABSTRACT OF THE DISCLOSURE

New piperidine-spiro-heterocycles; namely, piperidine-spiro-imidazolidines, piperidine-spiro-hydantions and piperidine-spiro-oxazolidines are valuable light stabilizers for the prevention of the photo-deterioration of various synthetic ploymers such as polyolefin, polyurethane, polyamide and the like. These piperidine-spiro-heterocycles are prepared by reacting 4-cyano-4-hydroxy (or -amino)-2,2,6,6-tetrasubstituted piperidine derivative with isocyanate derivative followed by heat treatment in the presence or absence of a strong mineral acid.

---

This invention relates to a new class of piperidine-spiro-heterocycles and process for preparing the same.

More particularly, it relates to the piperidine-spiro-heterocycles having the formula

[Structure I]

(I)

wherein

X is oxygen or sulfur atom;
Y is oxygen atom or imino group ($=$NH);
Z is oxygen atom or imino group ($=$NH);
$R_1$ and $R_2$ may be the same or different and each represents an alkyl group of 1 to 4 carbon atoms;
$n$ is an integer of 1 or 2; and
when $n$ is an integer of 1,
$R_3$ is an alkyl group, a cycloalkyl group of 5 to 7 ring carbon atoms, or an aryl group of 6 or 10 ring carbon atoms which may be substituted with a halogen atom, an alkyl group of 1 to 4 carbon atoms or an alkoxy group of 1 to 4 carbon atoms, and
when $n$ is an integer of 2,
$R_3$ is an arylene group which may be substituted with an alkyl group of 1 to 4 carbon atoms, an alkylene group, or
the group

[Structure]

in which $R_4$ is oxygen atom, sulfur atom, imino group (—NH—), the group —S—S—, or the group —$(CH_2)_m$—

($m$ is an integer of 1 to 6 inclusive).

Also, it relates to a process for the preparation of the piperidine-spiro-heterocycles having the above Formula I.

The piperidine-spiro-heterocycles (I) of this invention are all novel substances unknown in the art. They exhibit exceptionally high stabilizing effect against photo-deterioration of various synthetic polymers, especially homopolymers of olefins such as high and low pressure polyethylenes, polypropylene, polybutadiene, polyisoprene, polystyrene and the like; copolymers of olefins with other ethylenically unsaturated monomers such as ethylene-propylene copolymers, styrene-butadiene copolymers, acrylonitrile-butadiene-styrene copolymers and the like; polyurethanes; polyamides such as 6 nylon, 6–6 nylon and the like; polyacetals; polyesters such as polyethylene terephthalate and the like; and polymerized vinyl monomers such as polyvinyl chloride, polyvinyl acetate, polyvinylidene chloride, polyvinyl ethers, polyvinyl ketones and the like.

Where the piperidine compounds of the above Formula I are to be employed in the synthetic polymer for the purpose of stabilization, they may be readily incorporated into such polymers by various standard procedures commonly utilized in the art. The stabilizing piperidine compounds (I) of this invention may be incorporated into the synthetic polymer at any desired stage prior to the manufacture of shaped articles therefrom. For example, the dry stabilizer in a form of powder may be admixed with the synthetic polymer or a suspension or emulsion of such a stabilizer may be admixed with a suspension or emulsion of the polymer of this invention.

The amount of the piperidine compound to be employed in the synthetic polymer in accordance with this invention may be widely varied, depending upon mainly the types, properties and particular use of the polymer to be stabilized.

The usual and preferred concentrations of the stabilizer of this invention may fall within the range of about 0.005–2.0% by weight, and more preferably about 0.01–1.0% by weight, these concentrations being based upon the weight of the synthetic polymer employed.

The piperidine compound (I) of this invention may be optionally and advantageously employed for the purpose of stabilization, either alone or in combination with other additives such as known stabilizers (including, for example, antioxidants and ultraviolet absorbents), fillers, pigments and the like. In some cases, an optional combination of the two or more piperidine compounds (I) may be satisfactorily employed in this invention to obtain the improved results.

It is, accordingly, a primary object of this invention to provide new piperidine-spiro-heterocycles (I) which are useful as stabilizers for a wide variety of synthetic polymers against the photo-deterioration thereof. Another object of this invention is to provide a new and advantageous process for the preparation of the valuable piperidine-spiro-heterocycles (I).

Specifically speaking, in one aspect of this invention, these piperidine-spiro-heterocycles (I) of this invention are contemplated to include four groups of piperidine-spiro-heterocycles, which groups can be represented by the following Formulae I-a, I-b, I-c and I-d, respectively; namely,

[Structure I-a]

(I-a)

wherein $R_1$, $R_2$, $R_3$, X and $n$ are as defined above;

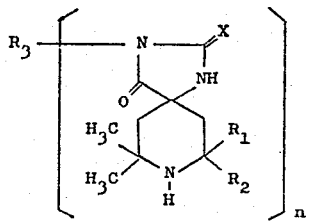

(I-b)

wherein $R_1$, $R_2$, $R_3$, X and $n$ are as defined above;

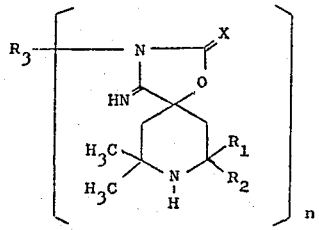

(I-c)

wherein $R_1$, $R_2$, $R_3$, X and $n$ are as defined above;

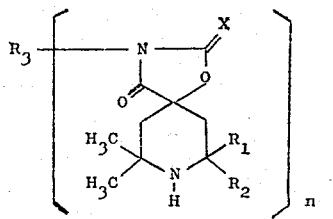

(I-d)

wherein $R_1$, $R_2$, $R_3$, X and $n$ are as defined above.

Representative examples of the piperidine compounds having the above Formulae I-a, I-b, I-c and I-d are listed hereinbelow. It is, however, to be understood that the present invention is not limited to those illustrated compounds.

Representative of the piperidine compounds of the Formula I-a are;

(1) 1,3,8-triaza-2-oxo-3-phenyl-4-imino-7,7,9,9-tetramethyl-spiro[4.5]decane;
(2) 1,3,8-triaza-2-oxo-3-(o-chlorophenyl)-4-imino-7,7,9,9-tetramethyl-spiro[4.5]decane;
(3) 1,3,8-triaza-2-oxo-3-(m-chlorophenyl)-4-imino-7,7,9,9-tetramethyl-spiro[4.5]decane;
(4) 1,3,8-triaza-2-oxo-3-(p-chlorophenyl)-4-imino-7,7,9,9-tetramethyl-spiro[4.5]decane;
(5) 1,3,8-triaza-2-oxo-3-(p-tolyl)-4-imino-7,7,9,9-tetramethyl-spiro[4.5]decane;
(6) 1,3,8-triaza-2-oxo-3-(o-methoxyphenyl)-4-imino-7,7,9,9-tetramethyl-spiro[4.5]decane;
(7) 1,3,8-triaza-2-oxo-3-(α-naphthyl)-4-imino-7,7,9,9-tetramethyl-spiro[4.5]decane;
(8) 1,3,8-triaza-2-oxo-3-ethyl-4-imino-7,7,9,9-tetramethyl-spiro[4.5]decane;
(9) 1,3,8-triaza-2-oxo-3-stearyl-4-imino-7,7,9,9-tetramethyl-spiro[4.5]decane;
(10) 1,3,8-triaza-2-oxo-3-cyclohexyl-4-imino-7,7,9,9-tetramethyl-spiro[4.5]decane;
(11) 2,4-bis(1,3,8-triaza-2-oxo-4-imino-7,7,9,9-tetramethyl-spiro[4.5]-decane-3-yl)toluene;
(12) 4,4'-bis(1,3,8-triaza-2-oxo-4-imino-7,7,9,9-tetramethyl-spiro[4.5]-decane-3-yl)-diphenylmethane;
(13) 4,4'-bis(1,3,8-triaza-2-oxo-4-imino-7,7,9,9-tetramethyl-spiro[4.5]-decane-3-yl)diphenylether;
(14) 1,6-bis(1,3,8-triaza-2-oxo-4-imino-7,7,9,9-tetramethyl-spiro[4.5]-decane-3-yl)n-hexane;
(15) 4,4'-bis(1,3,8-triaza-2-oxo-4-imino-7,7,9,9-tetramethyl-spiro[4.5]-decane-3-yl)biphenyl;
(16) P,P'-bis(1,3,8-triaza-2-oxo-4-imino-7,7,9,9-tetramethyl-spiro[4.5]-decane-3-yl)bibenzyl;
(17) 4,4'-bis(1,3,8-triaza-2-oxo-4-imino-7,7,9,9-tetramethyl-spiro[4.5]-decane-3-yl)diphenylsulfide;
(18) 4,4'-bis(1,3,8-triaza-2-oxo-4-imino-7,7,9,9-tetramethyl-spiro[4.5]-decane-3-yl)diphenyldisulfide;
(19) 4,4'-bis(1,3,8-triaza-2-oxo-4-imino-7,7,9,9-tetramethyl-spiro[4.5]-decane-3-yl)diphenylamine;
(20) 1,3,8-triaza-2-thioxo-3-phenyl-4-imino-7,7,9,9-tetramethyl-spiro[4.5]decane;
(21) 1,3,8-triaza-2-thioxo-3-cyclohexyl-4-imino-7,7,9,9-tetramethyl-spiro[4.5]decane;
(22) 1,3,8-triaza-2-thioxo-3-(α-naphthyl)-4-imino-7,7,9,9-tetramethyl-spiro[4.5]decane; and
(23) 1,3,8-triaza-2-thioxo-3-ethyl-4-imino-7,7,9,9-tetramethyl-spiro[4.5]decane.

Representative of the piperidine compounds of the Formula I-b are;

(24) 1,3,8-triaza-2,4-dioxo-3-phenyl-7,7,9,9-tetramethyl-spiro[4.5]decane;
(25) 1,3,8-triaza-2,4-dioxo-3-(m-chlorophenyl)-7,7,9,9-tetramethyl-spiro[4.5]decane;
(26) 1,3,8-triaza-2,4-dioxo-3-(p-chlorophenyl)-7,7,9,9-tetramethyl-spiro[4.5]decane;
(27) 1,3,8-triaza-2,4-dioxo-3-(α-naphthyl)-7,7,9,9-tetramethyl-spiro[4.5]decane;
(28) 1,3,8-triaza-2,4-dioxo-3-ethyl-7,7,9,9-tetramethyl-spiro[4.5]decane;
(29) 1,3,8-triaza-2,4-dioxo-3-stearyl-7,7,9,9-tetramethyl-spiro[4.5]decane;
(30) 1,3,8-triaza-2,4-dioxo-3-cyclohexyl-7,7,9,9-tetramethyl-spiro[4.5]decane;
(31) 1,3,8-triaza-2,4-dioxo-3-(p-tolyl)-7,7,9,9-tetramethyl-spiro[4.5]decane;
(32) 1,3,8-triaza-2-thioxo-3-phenyl-4-oxo-7,7,9,9-tetramethyl-spiro[4.5]decane;
(33) 1,3,8-triaza-2-thioxo-3-(α-naphthyl)-4-oxo-7,7,9,9-tetramethyl-spiro[4.5]decane;
(34) 1,3,8-triaza-2-thioxo-3-ethyl-4-oxo-7,7,9,9-tetramethyl-spiro[4.5]decane;
(35) 1,3,8-triaza-2-thioxo-3-cyclohexyl-4-oxo-7,7,9,9-tetramethyl-spiro[4.5]decane;
(36) 2,4-bis(1,3,8-triaza-2,4-dioxo-7,7,9,9-tetramethyl-spiro[4.5]-decane-3-yl)toluene;
(37) 4,4'-bis(1,3,8-triaza-2,4-dioxo-7,7,9,9-tetramethyl-spiro[4.5]-decane-3-yl)diphenylmethane;
(38) 4,4'-bis(1,3,8-triaza-2,4-dioxo-7,7,9,9-tetramethyl-spiro[4.5]-decane-3-yl)diphenylether;
(39) 1,6-bis(1,3,8-triaza-2,4-dioxo-7,7,9,9-tetramethyl-spiro[4.5]-decane-3-yl)n-hexane;
(40) 4,4'-bis(1,3,8-triaza-2,4-dioxo-7,7,9,9-tetramethyl-spiro[4.5]-decane-3-yl)biphenyl;
(41) P,P'-bis(1,3,8-triaza-2,4-dioxo-7,7,9,9-tetramethyl-spiro[4.5]-decane-3-yl)bibenzyl;
(42) 4,4'-bis(1,3,8-triaza-2,4-dioxo-7,7,9,9-tetramethyl-spiro[4.5]-decane-3-yl)diphenylsulfide;
(43) 4,4'-bis(1,3,8-triaza-2,4-dioxo-7,7,9,9-tetramethyl-spiro[4.5]-decane-3-yl)diphenyldisulfide; and
(44) 4,4'-bis(1,3,8-triaza-2,4-dioxo-7,7,9,9-tetramethyl-spiro[4.5]-decane-3-yl)diphenylamine.

Representative of the piperidine compounds of the Formula I-c are;

(45) 1-oxa-3,8-diaza-2-oxo-3-phenyl-4-imino-7,7,9,9-tetramethyl-spiro[4.5]decane;
(46) 1-oxa-3,8-diaza-2-oxo-3-cyclohexyl-4-imino-7,7,9,9-tetramethyl-spiro[4.5]decane;
(47) 1-oxa-3,8-diaza-2-oxo-3-(p-chlorophenyl)-4-imino-7,7,9,9-tetramethyl-spiro[4.5]decane;
(48) 1-oxa-3,8-diaza-2-oxo-3-(α-naphthyl)-4-imino-7,7,9,9-tetramethyl-spiro[4.5]decane;
(49) 1-oxa-3,8-diaza-2-oxo-3-ethyl-4-imino-7,7,9,9-tetramethyl-spiro[4.5]decane;

(50) 4,4'-bis(1-oxa-3,8-diaza-2-oxo-4-imino-7,7,9,9-tetramethyl-spiro[4.5]-decane-3-yl)diphenylether;
(51) 1-oxa-3,8-diaza-2-thioxo-3-phenyl-4-imino-7,7,9,9-tetramethyl-spiro[4.5]decane;
(52) 1-oxa-3,8-diaza-2-thioxo-3-ethyl-4-imino-7,7,9,9-tetramethyl-spiro[4.5]decane;
(53) 4,4'-bis(1-oxa-3,8-diaza-2-oxo-4-imino-7,7,9,9-tetramethyl-spiro[4.5]-decane-3-yl)biphenyl;
(54) P,P'-bis(1-oxa-3,8-diaza-2-oxo-4-imino-7,7,9,9-tetramethyl-spiro[4.5]-decane-3-yl)bibenzyl;
(55) 4,4'-bis(1-oxa-3,8-diaza-2-oxo-4-imino-7,7,9,9-tetramethyl-spiro[4.5]-decane-3-yl)diphenylsulfide;
(56) 4,4'-bis(1-oxa-3,8-diaza-2-oxo-4-imino-7,7,9,9-tetramethyl-spiro[4.5]-decane-3-yl)diphenyldisulfide; and
(57) 4,4'-bis(1-oxa-3,8-diaza-2-oxo-4-imino-7,7,9,9-tetramethyl-spiro[4.5]-decane-3-yl)diphenylamine.

Representative of the piperidine compounds of the Formula I–d are;

(58) 1-oxa-3,8-diaza-2,4-dioxo-3-(p-chlorophenyl)-7,7,9,9-tetramethyl-spiro[4.5]decane;
(59) 1-oxa-3,8-diaza-2,4-dioxo-3-(α-naphthyl)-7,7,9,9-tetramethyl-spiro[4.5]decane;
(60) 1-oxa-3,8-diaza-2,4-dioxo-3-ethyl-7,7,9,9-tetramethyl-spiro[4.5]decane;
(61) 1-oxa-3,8-diaza-2,4-dioxo-3-cyclohexyl-7,7,9,9-tetramethyl-spiro[4.5]decane;
(62) 4,4'-bis(1-oxa-3,8-diaza-2,4-dioxo-7,7,9,9-tetramethyl-spiro[4.5]-decane-3-yl)diphenylether;
(63) 1-oxa-3,8-diaza-2-thioxo-3-phenyl-4-oxo-7,7,9,9-tetramethyl-spiro[4.5]decane;
(64) 1-oxa-3,8-diaza-2-thioxo-3-ethyl-4-oxo-7,7,9,9-tetramethyl-spiro[4.5]decane;
(65) 4,4'-bis(1-oxa-3,8-diaza-2,4-dioxo-7,7,9,9-tetramethyl-spiro[4.5]-decane-3-yl)biphenyl;
(66) P,P'-bis(1-oxa-3,8-diaza-2,4-dioxo-7,7,9,9-tetramethyl-spiro[4.5]-decane-3-yl)biphenyl;
(67) 4,4'-bis(1-oxa-3,8-diaza-2,4-dioxo-7,7,9,9-tetramethyl-spiro[4.5]-decane-3-yl)diphenylsulfide;
(68) 4,4'-bis(1-oxa-3,8-diaza-2,4-dioxo-7,7,9,9-tetramethyl-spiro[4.5]-decane-3-yl)diphenyldisulfide; and
(69) 4,4'-bis(1-oxa-3,8-diaza-2,4-dioxo-7,7,9,9-tetramethyl-spiro[4.5]-decane-3-yl)diphenylamine.

In another aspect of this invention, there is provided a process for the preparation of the piperidine-spiro-heterocycles of the above Formula I. More specifically, the present process includes two specific embodiments for the preparation of said piperidine-spiro-heterocycles (I): that is, a specific embodiment for preparing the piperidine-spiro-imidazolidines (I–a) or the piperidine-spiro-hydantoins (I–b); and that for preparing the piperidine-spiro-oxazolidines (I–c) or (I–d). These embodiments (hereinafter referred to a "Process A" and "Process B," respectively) can be diagrammatically shown in the following reaction schema and will be fully discussed hereinbelow:

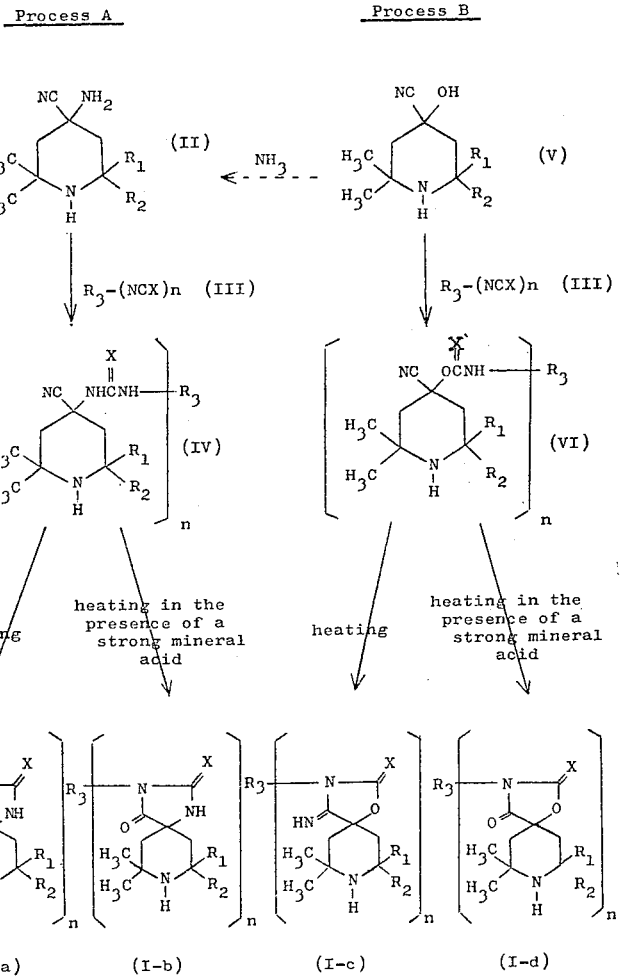

Process A

In one specific embodiment of the process of this invention, the piperidine-spiro-heterocycles of the above Formulae I–a and I–b are prepared by the "Process A" which comprises (A) reacting the piperidine compound having the above Formula II with the isocyanate or isothiocyanate derivative having the above Formula III to give the piperidine compound having the above Formula IV and then (B) converting the latter product (IV) to the desired product (I–a) by heating in the absence of a strong mineral acid or converting the latter product (IV) to the desired product (I-b) by heating in the presence of a strong mineral acid.

In carrying out the "Process A," the first step, i.e. the preparation of the intermediate (IV) from the piperidine compound (II) may be satisfactorily conducted by utilizing any of conventional procedures ordinarily employed in the art to accomplish the reaction of an amine with an isocyanate or isothiocyanate. The reaction in this step may be preferably conducted by dissolving the starting piperidine compound (II) in a suitable reaction solvent, adding the isocyanate or isothiocyanate derivative (III) to the resulting solution, usually at room temperature or under ice-cooling, and then stirring the resulting mixture at a temperature ranging from room temperature to about 80° C. for about 1 to 10 hours. As a reaction solvent, there may be conveniently employed any of organic solvents inert to the isocyanate or isothiocyanate reagent (III), but such aprotic solvents as benzene, toluene and the like are preferred because of attainment of a higher yield of the desired product within a relatively short reaction period as compared with other utilizable organic solvent, especially it being said true when the isocyanate or isothiocyanate derivative of the above Formula III wherein the X represents oxygen atom will be employed as a reagent in this reaction. After completion of the reaction, the reaction product may be recovered from the reaction mixture with a conventional means, for example, by removal of the reaction solvent with distillation and it may be employed as the starting material in the following second step, if necessary after further purification. Alternatively, after completion of the reaction, the reaction mixture as such, may be satisfactorily employed as the starting material for the second step without isolation and purification of the intermediate (IV) contained therein.

The second step in this "Process A," i.e. the preparation of the desired product (I-a) and that of the desired product (I-b) may be suitably conducted as follows.

The reaction for the preparation of the product (I-a) may be preferably conducted by heating the piperidine compound (IV) in a suitable solvent or by heating the reaction mixture obtained from the above first step. As a solvent, there may be conveniently employed any of organic and inorganic solvents not adversely affecting the reaction and reactants, but such protic solvents as methanol, ethanol, aqueous methanol, aqueous ethanol are preferred because of attainment of a higher yield of the desired product within a relatively short period as compared with other utilizable solvents, especially it being said so when the piperidine compound of the above Formula IV wherein the X represents oxygen atom will be employed as a starting material in this step. The heating period and the temperature range required in this step are not critical and they may be easily selected and determined by those skilled in the art, depending upon the types and kinds of the substituent $R_3$ and other factor. It is, however, usual and desirable to carry out the heat treatment at about 50–150° C. for about 1–10 hours. After completion of the reaction, the reaction product (I-a) may be recovered from the reaction mixture and purified by a conventional way, for example, by concentrating the reaction mixture under reduced pressure or cooling it, and then recovering the desired product so separated by filtration and, if desired, purifying the crude product through recrystallization from a suitable organic solvent such as, for example, methanol, ethanol, benzene and the like.

And, the reaction for the preparation of the desired product (I-b) may be preferably conducted by heating the piperidine compound (IV) or the reaction mixture obtained from the above first step in the presence of a strong mineral acid, preferably employed in the form of an aqueous solution. Examples of the strong mineral acids which may be employed in this step include hydrochloric acid, sulfuric acid, nitric acid and the like. The heating period and temperature range required are not critical in this step, but it is usual and preferable to carry out the heat treatment at about 60–130° C. for about 1–10 hours. After completion of the reaction, the reaction product (I-b) may be recovered and purified by a conventional way as explained above for the product (I-a).

The starting material (II) in this "Process A" are all novel substances and may be easily prepared, for example, by the following process; by reacting the correspond 2,2-dimethyl-4-oxo-6,6-disubstituted piperidine compound with hydrogen cyanide or reacting said piperidine compound with an alkali metal bisulfite followed by reaction with hydrogen cyanide or an alkali metal cyanide, thereby to produce the piperidine compound having the above formula (V) and then treating the latter product (V) with aqueous ammonia or; by reacting the corresponding 2,2-dimethyl-4-oxo-6,6-disubstituted piperidine compound with ammonia and hydrogen cyanide according to the Strecker's Reaction.

Process B

In another specific embodiment of the process of this invention, the piperidine-spiro-heterocycles of the above Formulae I–c and I–d are prepared by the "Process B" which comprises (A) reacting the piperidine compound having the above Formula V with the isocyanate or isothiocyanate derivative having the above Formula III to give the intermediate (VI) and then (B) heating the latter product (VI) in the absence of a strong mineral acid to produce the desired product (I–c) or heating the latter product (VI) in the presence of a strong mineral acid to produce the desired product (I–d).

In carrying out the "Process B," the first step, i.e. the reaction of the starting material (V) with the isocyanate or isothiocyanate derivative (III) may be satisfactorily conducted by utilizing any of conventional procedures ordinarily employed in the art to accomplish the reaction of a hydroxyl compound with an isocyanate or isothiocyanate. The reaction in this step may be preferably conducted by dissolving the starting piperidine compound (V) in a suitable reaction solvent, adding the isocyanate or isothiocyanate derivative (III) to the resulting solution, usually at room temperature or under ice-cooling, and then stirring the resulting mixture at a temperature ranging from room temperature to about 80° C. for about 1 to 10 hours. As a reaction solvent, there may be conveniently employed any of organic solvents inert to the isocyanate or isothiocyanate reagent (III) such as benzene, toluene, n-hexane and the like and the mixture thereof. In this reaction, the reaction, product can be represented by the above Formula VI and it is not essentially required in this "Process B" to isolate and purify the reaction product (VI) for the subsequent reaction. Thus, after completion of the reaction, the reaction mixture as such, may be satisfactorily employed as the starting material for the second step without isolation and purification of the intermediate product (VI) contained therein. However, if desired, after completion of the reaction, the reaction product (VI) may be recovered and purified by a conventional method and then it may be satisfactorily employed as a starting material for the subsequent reaction in the "Process B," which will be illustratively disclosed hereinbelow.

The second step in this "Process B," i.e. the preparation of the desired product (I–c) and that of the desired product (I–d) may be conducted as follows.

The reaction for the preparation of the desired product (I–c) may be preferably conducted by heating in the absence of a strong mineral acid the reaction mixture obtained from the above-mentioned first step, as such. The heating period and the temperature range required are not critical and they may be easily selected and determined by those skilled in the art, depending upon the types and kinds of the substituents $R_3$ and other factors. It is, however, usual and desirable to carry out said heat treatment at about 50–150° C. for about 1–10 hours.

After completion of the reaction, the reaction product (I–c) may be recovered from the reaction mixture and purified by a conventional way, for example, by concentrating the reaction mixture under reduced pressure or cooling it and then recovering the desired product so separated by filtration and, if desired purifying the crude product through recrystallization from a suitable organic solvent such as, for example, methanol, ethanol, benzene and the like.

Alternatively, such preparation may be, if desired, conducted by heating in the absence of a strong mineral acid the isolated intermediate (VI) in a suitable solvent. As a reaction solvent, there may be conveniently employed any of organic solvents inert to the reaction and reactants such as benzene, toluene, n-hexane and the like and the mixture thereof. With regard to the heating period, temperature range upon heating, recovery and purification of the desired product and so on, there may be equally and satisfactorily employed those as disclosed above in the case of heat treatment of the reaction mixture containing the intermediate (VI) therein.

The reaction for the preparation of the desired product (I–d) may be preferably conducted by heating the reaction mixture obtained from first step in the presence of a strong mineral acid, preferably employed in the form of an aqueous acid solution. Examples of the strong mineral acid which may be employed include hydrochloric acid, sulfuric acid, nitric acid and the like. The heating period and temperature range required are not critical in this step, but it is usual and preferable to practice the heat treatment at about 60–130 C. for about 1–10 hours. After completion of the reaction, the reaction product (I–d) may be recovered and purified by a conventional way as explained above for the desired product (I–a).

Alternatively, such preparation may be, if desired, conducted by heating the isolated intermediate (VI) in the presence of a strong mineral acid, preferably employed in the form of an aqueous acid solution. With regard to the kinds of a strong mineral acid, heating period, temperature range upon heating, recovery and purification of the desired product and so on, it is to be understood that there may be satisfactorily utilized those as disclosed above in the case of heat treatment of the reaction mixture as such.

The starting material (V) in this "Process B" are all novel substances and may be easily prepared, for example, by the following process; by reacting the corresponding 2,2-dimethyl-4-oxo-6,6-disubstituted-piperidine compound with hydrogen cyanide; or by reacting said piperidine compound with an alkali metal bisulfite followed by reaction with hydrogen cyanide or alkali metal cyanide. As explained above, this starting material (V) may be easily converted to the starting material (II) in the "Process A" by treatment with aqueous ammonia.

For the purpose of illustrating the preparation of the piperidine compounds (I) of this invention, some embodiments of the preparation of such piperidines are given hereinbelow.

EXAMPLE 1

Preparation of 1,3,8-triaza-2-oxo-3-phenyl-4-imino-7,7,9,9-tetramethyl-spiro[4.5]decane To a solution of 2 g. of 4-cyano-4-amino-2,2,6,6-tetramethyl-piperidine in 30 ml. of benzene was added dropwise a solution of 1.3 g. of phenyl isocyanate in 30 ml. of benzene with stirring at room temperature. After completion of the dropwise-addition, the reaction mixture was stirred at room temperature for 3 hours and then at 70–80° C. for 1 hours. After cooling, the crystalline substance thus separated was recovered by filtration and then recrystallized from benzene to give 4-cyano-4-(3 - phenylureido)-2,2,6,6-tetramethylpiperidine as white crystals melting at 158–159° C.

A solution of 5 g. of the 4-cyano-4-(3-phenylureido)-2,2,6,6-tetramethylpiperidine obtained as above in 100 ml. of 50% aqueous ethanol was heated under reflux for 5 hours. The reaction mixture was concentrated, the crystalline residue thus separated recovered by filtration and then recrystallized from benzene to give the desired product as white crystals melting at 176–177° C.

Analysis.—Calculated for $C_{17}H_{24}ON_4$ (percent): C, 67.97; H, 8.05; N, 18.65. Found (percent): C, 68.12; H, 6.08; N, 18.48.

I.R. spectrum (Nujol) $\nu_{C=NH}$ 1,663 cm.$^{-1}$, $\nu_{C=O}$ 1.754 cm.$^{-1}$. The absorption band due to $\nu_{CN}$ disappeared.

EXAMPLE 2

Preparation of 4,4'-bis(1,3,8-triaza-2-oxo-4-imino-7,7,9,9-tetramethyl-spiro[4.5]3-decyl)diphenylether To a solution of 3.1 g. of 4-amino-4-cyano-2,2,6,6-tetramethylpiperidine in 30 ml. of benzene was added 2 g. of diphenylether-4,4'-diisocyanate at room temperature with stirring. The resulting mixture was stirred at room temperature for 2 hours and then at 40–50° C. for 5 hours. After removal of the benzene by distillation, the residual crystalline substance was recrystallized from benzene to give 4,4'-bis(4-cyano-2,2,6,6-tetramethyl-4-piperidylureylene)diphenylether as white crystals melting at 165–167° C.

To 2 g. of the 4,4'-bis(4-cyano-2,2,6,6-tetramethyl-4-piperidylureylene)diphenylether obtained as above was added 20 ml. of 50% ethanol. The resulting mixture was heated under reflux for 6 hours. After removal of the solvent by distillation, the residual crystalline substance was recrystallized from benzene to give the desired product as white crystals melting at 225–226° C.

Analysis.—Calculated for $C_{34}H_{46}O_3N_8$ (percent): C, 66.41; H, 7.56; N, 18.63. Found (percent): C, 66.46; H, 7.60; N, 18.61.

I.R. spectrum (Nujol) $\nu_{C=NH}$ 1,663 cm.$^{-1}$, $\nu_{C=O}$ 1,747 cm.$^{-1}$. The absorption band due to $\nu_{C=N}$ disappeared.

EXAMPLES 3

Preparation of 4,4'-bis(1,3,8-triaza-2-oxa-4-imino-7,7,9,9-tetramethyl-spiro[4,5]-3-decyl)diphenylether A solution of 3.1 g. of 4-amino-4-cyano-2,2,6,6-tetramethylpiperidine and 2 g. of diphenylether-4,4'-diisocyanate in 20 ml. of benzene was heated at 60–70° C. with stirring for 4 hours. Then, 10 ml. of 95% ethanol was added to the solution. The resulting mixture was heated under reflux for 8 hours. After removal of the solvent by distillation, the residual crystalline substance was recrystallized from benzene to give a white crystalline substance, which melts at 225–226° C. and is identified with the end product obtained in the above Example 2 by measurement of a mixed melting point and infrared spectrum.

Following the same procedure as described in the above example except that there was employed the corresponding isocyanate or isothiocyanate instead of phenyl isocyanate or disphenylether-4,4'-diisocyanate, there were similarly obtained the following piperdine-spiro-imidazolidines (I-a);

1,3,8-triaza-2-oxo-3-(o-chlorophenyl)-4-imino-7,7,9,9-tetramethyl-spiro[4.5]decane (M.P. 210–211° C.);
1,3,8-triaza-2-oxo-3-(m-chlorophenyl)-4-imino-7,7,9,9-tetramethyl-spiro[4.5]decane (M.P. 157–158° C.);
1,3,8-triaza-2-oxo-3-(p-chlorophenyl)-4-imino-7,7,9,9-tetramethyl-spiro[4.5]decane (M.P. 225–226° C.);
1,3,8-triaza-2-oxo-3-(α-naphthyl)-4-imino-7,7,9,9-tetramethyl-sspiro[4.5]decane (M.P. 251–252° C.);
1,3,8-triaza-2-oxo-3-ethyl-4-imino-7,7,9,9-tetramethyl-spiro[4.5]decane (M.P. 156–157° C.);
1,3,8-triaza-2-oxo-3-stearyl-4-imino-7,7,9,9-tetramethyl-spiro[4.5]decane (M.P. 114–1151 C.);
1,3,8-triaza-2-oxo-3-cyclohexyl-4-imino-7,7,9,9-tetramethyl-spiro[4.5]decane (M.P. 211–212° C.);

2,4-bis(1,3,8-triaza-2-oxo-4-imino-7,7,9,9-tetramethyl-spiro[4.5]-3-decyl)toluene (M.P. 230–232° C.);
4,4'-bis(1,3,8-triaza-2-oxo-4-imino-7,7,9,9-tetramethyl-spiro[4.5]-3-decyl)diphenylmethane (M.P. 218–219° C.);
1,6-bis(1,3,8-triaza-2-oxo-4-imino-7,7,9,9-tetramethyl-spiro[4.5]-3-decyl)n-hexane (M.P. 259–260° C.);
1,3,8-triaza-2-thioxo-3-phenyl-4-imino-7,7,9,9-tetramethyl-spiro[4.5]decane (M.P. 176–177° C.);
1,3,8-triaza-2-thioxo-3-cyclohexyl-4-imino-7,7,9,9-tetramethyl-spiro[4.5]decane (M.P. 176–178° C.);
1,3,8-triaza-2-thioxo-3-($\alpha$-naphthyl)-4-imino-7,7,9,9-tetramethyl-spiro[4.5]decane (M.P. 221–222° C.);
1,3,8-triaza-2-thioxo-3-ethyl-4-imino-7,7,9,9-tetramethyl-spiro[4.5]decane (M.P. 215–216° C.).

EXAMPLE 4

Preparation of 1,3,8-triaza-2,4-dioxo-3-($\alpha$-naphthyl)-7,7,9,9-tetramethyl-spiro[4.5]decane To a solution of 5 g. of 4-cyano-4-amino-2,2,6,6-tetramethyl-piperidine in 30 ml. of benzene was added dropwise a solution of 4.7 g. of $\alpha$-naphthyl isocyanate in 10 ml. of benzene with stirring at room temperature. After completion of the dropwise-addition, the reaction mixture was stirred at room temperature for 3 hours and then 70–80° C. for 1 hour. After cooling, the crystalline substance thus separated was recovered by filtration and then recrystallized from benzene to give 4-cyano-4-(3-$\alpha$-naphthylureido)-2,2,6,6-tetramethylpiperidine as white crystals melting at 206–207 C.

A solution of 2 g. of 4-cyano-4-(3-$\alpha$-naphthylureido)-2,2,6,6-tetramethylpiperidine in 20 ml. of 15% aqueous hydrochloric acid was heated with stirring on a water bath for 8 hours. The reaction mixture was concentrated under reduced pressure and the residue neutralized by addition of sodium carbonate. The crystalline substance thus separated was recovered by filtration, washed with water and then recrystallized from aqueous ethanol to give the desired product as white crystals melting at 237–238° C.

Analysis.—Calculated for $C_{21}H_{25}O_2N_3$ (percent): C, 71.77; H, 7.17; N, 11.96. Found (percent): C, 71.65; H, 7.22; N, 11.79.

EXAMPLE 5

Preparation of 4,4'-bis(1,3,8-triaza-2,4-dioxo-7,7,9,9-tetramethyl-spiro[4.5]-3-decyl)diphenylether To a solution of 3.1 g. of 4-cyano-4-amino-2,2,6,6-tetramethylpiperidine in 30 ml. of benzene was added 2 g. of diphenyl-ether-4,4'-diisocyanate at room temperature with stirring. The resulting mixture was stirred at room temperature for 2 hours and then at 40–50 C. for 5 hours. After removal of the benzene by distillation, the residual crystalline substance was recrystallized from benzene to give 4,4' - bis(4-cyano-2,2,6,6-tetramethyl-4-piperidylureylene)diphenylether as white crystals melting at 165–167 C.

To a solution of 3 g. of the 4,4'-bis(4-cyano-2,2,6,6-tetramethyl - 4 - piperidylureylene)diphenylether obtained as above in 15 ml. of 95% ethanol was added slowly with stirring 15 ml. of 35% aqueous hydrochloric acid at room temperature. The resulting mixture was then heated under reflux for 6 hours. After cooling, the crystalline substance separated was recovered by filtration and dissolved in 30 ml. of water.

The resulting aqueous solution was neutralized by addition of a 5% aqueous sodium carbonate solution. The crystalline substance thus separated was recovered by filtration, washed with water, dried and then recrystallized from benzene to give the desired product as white crystals melting at about 260 C.

Analysis.—Calculated for $C_{34}H_{44}O_5N_6$ (percent): C, 66.21; H, 7.19; N, 13.63. Found (percent): C, 66.11; H, 7.05; N, 13.69.

I.R. spectrum (Nujol) $\nu_{C=O}$ 1,730 cm.$^{-1}$.

Following the same procedure as described in the above example except that there was employed the corresponding isocyanate or isothiocyanate instead of phenyl isocyanate or diphenylether - 4,4' - diisocyanate, there were similarly obtained the following piperidine-spiro-hydantoins (I–b);

1,3,8-triaza-2,4-dioxo-3-phenyl-7,7,9,9-tetramethyl-spiro[4.5]decane (M.P. 148–149 C.);
1,3,8-triaza-2,4-dioxo-3-(m-chlorophenyl)-7,7,9,9-tetramethyl-spiro[4.5]decane (M.P. 162–163 C.);
1,3,8-triaza-2,4-dioxo-3-(p-chlorophenyl)-7,7,9,9-tetramethyl-spiro[4.5]decane (M.P. 200–201 C.);
1,3,8-triaza-2,4-dioxo-3-ethyl-7,7,9,9-tetramethyl-spiro[4.5]decane (M.P. 165–166 C.);
1,3,8-triaza-2,4-dioxo-3-stearyl-7,7,9,9-tetramethyl-spiro[4.5]decane (M.P. 95–96 C.);
1,3,8-triaza-2,4-dioxo-3-cyclohexyl-7,7,9,9-tetramethyl-spiro[4.5]decane (M.P. 186–187 C.);
1,3,8-triaza-2-thioxo-3-($\alpha$-naphthyl)-4-oxo-7,7,9,9-tetramethyl-spiro[4.5]decane (M.P. 260 C.);
1,3,8-triaza-2-thioxo-3-ethyl-4-oxo-7,7,9,9-tetramethyl-spiro[4.5]decane (M.P. 172–173 C.);
2,4-bis(1,3,8-triaza-2,4-dioxo-7,7,9,9-tetramethyl-spiro[4.5]-3-decyl)toluene (M.P. 250 C.);
4,4'-bis(1,3,8-triaza-2,4-dioxo-7,7,9,9-tetramethyl-spiro[4.5]-3-decyl)diphenylmethane (M.P. 232–234 C.); and
1,6-bis(1,3,8-triaza-2,4-dioxo-7,7,9,9-tetramethyl-spiro[4.5]-3-decyl)n-hexane (M.P. 254–255 C.).

EXAMPLE 6

Preparation of 1-oxa-3,8-diaza-2-oxo-3-ethyl-4-imino-7,7,9,9-tetramethyl-spiro[4.5]decane To a solution of 3.5 g. of 4-cyano-4-hydroxy-2,2,6,6-tetramethylpiperidine in a mixture of 80 ml. of benzene and 10 ml. of dimethylformamide was added 1.5 g. of ethyl isocyanate. The resulting mixture was stirred for 2 days while heating to 30–40 C. The reaction mixture was concentrated under reduced pressure to leave an oily residue which was then crystallized with aqueous methanol to give the desired product as white crystals melting at 66–67° C.

Analysis.—Calculated for $C_{13}H_{23}N_3O_2$ (percent): C, 61.63; H, 9.15; N, 16.59. Found (percent): C, 61.56; H, 9.21; N, 16.55.

Following the same procedure as described in the above Example 6 except that there was employed the corresponding isocyanate instead of ethyl isocyanate, there were similarly obtained the following piperidine-spiro-oxazolidines (I–c);

1-oxa-3,8-diaza-2-oxo-3-phenyl-4-imino-7,7,9,9-tetramethyl-spiro[4.5]decane (M.P. 135–136 C.);
1-oxa-3,8-diaza-2-oxo-3-(p-chlorophenyl)-4-imino-7,7,9,9-tetramethyl-spiro[4.5]decane (M.P. 161–162 C.);
1-oxa-3,8-diaza-2-oxo-3-($\alpha$-naphthyl)-4-imino-7,7,9,9-tetramethyl-spiro[4.5]decane (M.P. 230–231 C.); and
4,4'-bis(1-oxa-3,8-diaza-2-oxo-4-imino-7,7,9,9-tetramethyl-spiro [4.5]-3-decyl) diphenylether (M.P. 233–235 C.).

EXAMPLE 7

Preparation of 1-oxa-3,8-diaza-2,4-dioxo-3-(p-chlorophenyl)-7,7,9,9-tetramethyl-spiro[4.5]decane In 30 ml. of benzene was dissolved with heating 3.8 g. of 4-cyano-4-hydroxy - 2,2,6,6 - tetramethylpiperidine. The resulting solution was cooled to room temperature and then 3.5 g. of p-chlorophenyl isocyanate was added thereto. The resulting mixture was stirred for 24 hours while heating at 30–40 C. After removal of the benzene by distillation under reduced pressure, there was left a residue containing some crystalline substances.

To the residue was added 30 ml. of 50% aqueous ethanol and then 20 ml. of conc. hydrochloric acid was gradually added thereto. The reaction mixture was heated under gentle reflux for 8 hours. The reaction mixture was then concentrated under reduced pressure and the crystalline substance thus separated was washed with benzene. The substance was dissolved in water and the aqueous solution was neutralized with sodium carbonate. The crystalline substance thus separated was recovered by filtration, washed with water, dried and then recrystallized from methanol to give the desired product as white needles melting at 182–183 C.

*Analysis.*—Calculated for $C_{17}H_{21}N_2O_3Cl$ (percent): C, 60.62; H, 6.28; N, 8.32. Found (percent): C, 60.50; H, 6.34; N, 8.27.

Following the same procedure as described in the above Example 7 except that there was employed α-naphthyl isocyanate instead of p-chlorophenyl isocyanate, there was obtained 1-oxa-3,8-diaza-2,4-dioxo-3-(α-naphthyl)-7,7,9,9-tetramethyl-spiro[4.5]decane (M.P. 237–238 C.).

What is claimed is:
1. A compound having the formula

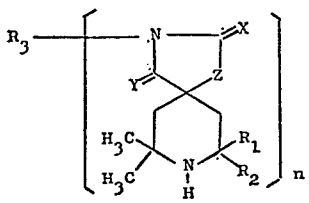

wherein

X is oxygen or sulfur atom;
Y is oxygen atom or imino group (=NH);
Z is oxygen atom or imino group (=NH);
$R_1$ and $R_2$ may be the same or different and each represents an alkyl group of 1 to 4 carbon atoms;
$n$ is an integer of 1 or 2; and
where $n$ is an integer of 1,
  $R_3$ is an alkyl group of 1 to 18 carbon atoms,
    a cyclohexyl group,
    a phenyl group which may be substituted with a halogen atom,
    an alkyl group of 1 to 4 carbon atoms
    or an alkoxy group of 1 to 4 carbon atoms, or
    a naphthyl group and,
where $n$ is an integer of 2,
  $R_3$ is a 2,4-toluyl group,
    a biphenylene group,
    a 1,6-n-hexylene group or
    the group

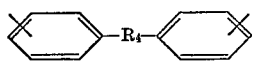

in which $R_4$ is oxygen atom, sulfur atom,
  imino group (—NH—), the group —S—S— or
  the group —(CH$_2$)$_m$, $m$ being an integer of 1 or 2 inclusive.

2. 1,3,8-triaza-2-oxo-3-phenyl-4-imino-7,7,9,9-tetramethyl-spiro[4.5]decane.
3. 1,38-triaza-2-oxo-(p-chlorophenyl)-4-imino-7,7,9,9-tetramethyl-spiro[4.5]decane.
4. 1,3,8-triaza-2-oxo-3-ethyl-4-imino-7,7,9,9-tetramethyl-spiro[4.5]decane.
5. 1,3,8-triaza-2-oxo-3-stearyl-4-imino-7,7,9,9-tetramethyl-spiro[4.5]decane.
6. 1,3,8-triaza-2-oxo-3-cyclohexyl-4-imino-7,7,9,9-tetramethyl-spiro[4.5]decane.
7. 2,4-bis(1,3,8-triaza-2-oxo-4-imino-7,7,9,9-tetramethyl-spiro[4.5]decane-3-yl)toluene.
8. 4,4'-bis(1,3,8-triaza-2-oxo-4-imino-7,7,9,9-tetramethyl-spiro[4.5]-decane-3-yl)diphenylmethane.
9. 1,6-bis(1,3,8-triaza-2-oxo-4-imino-7,7,9,9-tetramethyl-spiro[4.5]-decane-3-yl)n-hexane.
10. 1,3,8-triaza-2-thioxo-3-phenyl-4-imino-7,7,9,9-tetramethyl-spiro[4.5]decane.
11. 1,3,8-triaza-2-thioxo-3-cyclohexyl-4-imino-7,7,9,9-tetramethyl-spiro[4.5]decane.
12. 1,3,8-triaza-2,4-dioxo-3-phenyl-7,7,9,9-tetramethyl-spiro[4.5]decane.
13. 1,3,8-triaza-2,4-dioxo-3-(p-chlorophenyl)-7,7,9,9-tetramethyl-spiro[4.5]decane.
14. 1,3,8-triaza-2,4-dioxo-3-cyclohexyl-7,7,9,9-tetramethyl-spiro[4.5]decane.
15. 1,3,8-triaza-2,4-dioxo-3-ethyl-7,7,9,9-tetramethyl-spiro[4.5]decane.
16. 1,3,8-triaza-2,4-dioxo-3-stearyl-7,7,9,9-tetramethyl-spiro[4.5]decane.
17. 2,4-bis(1,3,8-triaza-2,4-dioxo-7,7,9,9-tetramethyl-spiro[4.5]-decane-3-yl)toluene.
18. 4,4'-bis(1,3,8-triaza-2,4-dioxo-7,7,9,9-tetramethyl-spiro[4.5])-decane-3-yl)diphenylmethane.
19. 1,6-bis(1,3,8-triaza-2-dioxo-7,7,9,9-tetramethyl-spiro[4.5]-decane-3-yl)n-hexane.

References Cited

UNITED STATES PATENTS 3,463,787   8/1969   Kirchner et al. _____ 260—309.7

OTHER REFERENCES

Chemical Abstracts, vol. 52: 9104c, 1958, Mailey et al.
J.A.C.S., vol. 58: pp. 474–77, 1936, Rigler et al.
Hackh's Chemical Dictionary, 4th ed., ed. Julius Grant, McGraw-Hill Book Co., p. 636, 1969.
Handbook of Chemistry, 10th ed., ed. Lang, McGraw-Hill Book Co., p. 353, 1961.

HENRY R. JILES, Primary Examiner

S. D. WINTERS, Assistant Examiner

U.S. Cl. X.R.

260—45.8 N, 45.8 NZ